United States Patent Office 3,631,164
Patented Dec. 28, 1971

3,631,164
WATER-SOLUBLE, BASIC AZO DYESTUFFS
Gert Hegar, Basel, Switzerland, assignor to Ciba Limited, Basel, Switzerland
No Drawing. Filed Dec. 29, 1966, Ser. No. 605,609
Claims priority, application Switzerland, Jan. 14, 1966, 483/66; Nov. 17, 1966, 16,519/66
Int. Cl. C09b 29/06; D06p 1/02
U.S. Cl. 260—156       12 Claims

ABSTRACT OF THE DISCLOSURE

Water-soluble basic azo-dyestuffs containing an ammonium-alkanoyl radical bound to an aminonaphthalene coupling component.

---

The present invention provides water-soluble basic azo dyestuffs free from acidic groups imparting solubility in water, especially sulphonic acid or carboxylic acid groups, which correspond to the formula

A—N=N—B in which A represents the residue of a diazotized amine and B represents the residue of a coupling component, and in which at least one of the residues A or B is derived from an aminonaphthalene containing a group of the formula

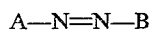

attached to the naphthalene nucleus, in which formula "alk" represents an alkylene group, $R_1$, $R_2$ and $R_3$ each represent an alkyl, aralkyl or cycloalkyl radical, and $R_1$, $R_2$ and $R_3$ may, together with the nitrogen atom, form a heterocyclic ring, and X represents an anion.

The invention also provides a process for the manufacture of water-soluble basic azo dyestuffs of the above formula, wherein (a) a diazotized amine is coupled with a coupling component, at least one of the components being an aminonaphthalene containing a group of the formula

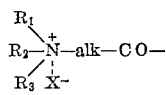

attached to the naphthalene nucleus, in which formula $R_1$, $R_2$, $R_3$ and X have the meanings given above, or (b) an azo dyestuff, the diazo and/or coupling component of which is derived from an aminonaphthalene containing a halogenated acyl group attached to the naphthalene nucleus, is reacted with a tertiary amine of the formula

or (c) an azo dyestuff in which at least one of the residues of the diazo component and coupling component is derived from an aminonaphthalene containing a group of the formula

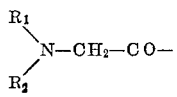

is treated with a quaternizing agent.

The amino group in the aminonaphthalenes to be used in method (a) may be substituted, for example, by one or two alkyl groups or a phenyl group. The aminonaphthalenes preferably correspond to the formula

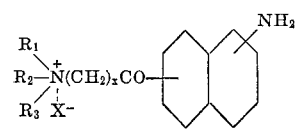

in which $R_1$, $R_2$ and $R_3$ have the meanings given above and n stands for 1 or 2. These compounds are obtainable by condensing an acylated or dialkylated aminonaphthalene with chloracetyl chloride or chloropropionyl chloride in the presence of aluminium chloride, reacting the chloracetyl compound so obtained with the appropriate tertiary amine and, if necessary, splitting off the N-acyl group. The following starting materials may be mentioned as examples: 1 - acetylaminonaphthalene, 2 - acetylaminonaphthalene, N-acetyl-1-ethylaminonaphthalene, N-acetyl-1-methylaminonaphthalene, N-acetyl-1-phenylaminonaphthalene, N-acetyl-2-ethylaminonaphthalene, N-acetyl-2-phenylaminonaphthalene and 2-diethylaminonaphthalene.

The aminonaphthalenes containing the residue of the formula

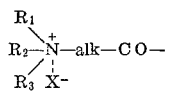

to be used in accordance with the invention may be used both as diazo and coupling components. In the former case it is natural that only aminonaphthalenes having a primary amino group are used. Subsequent to diazotization, they can be coupled with any desired coupling component, for example, with those of the benzene or naphthalene series or with those of the heterocyclic series. Of the coupling components of the benzene series, special mention may be made of the aminobenzenes, for example, dimethylaniline, diethylaniline, N-ethyl-N-cyanoethylaniline, di-(cyanoethyl)-aniline, di(hydroxyethyl)-aniline, di-(cyanoethoxyethoxy)-aniline, N-ethyl-N-phenylaniline or diphenylamine. Of the coupling components of the naphthalene series, mention may be made, for example, of 1- or 2-naphthylamine and also 2-phenylaminonaphthalene. Suitable heterocyclic coupling components are, for example, the indoles, for example, 2-methylindole, 2,5-dimethylindole, 2,4-dimethyl-7-methoxyindole, 2-methyl-5-ethoxyindole, 2-methyl-5- or -6-chloroindole, 1,2-dimethylindole, 1-methyl-2-phenylindole, 2-methyl-5-nitroindole, 2-methyl-5-cyanoindole, 2 - methylchloroindole, 2-methyl-5,7-dichloroindole or 2-phenylindole, 1-cyanoethyl-2,6-dimethyl-indoline, and also pyrazoles, for example, 1-phenyl-5-aminopyrazole or 3-methyl-pyrazolone-5 or 1-phenyl-3-methylpyrazolone-5, quinolines, for example, 1-methyl-4-hydroxyquinoline-2 or pyrimidines, for example, barbituric acid.

When aminonaphthalenes containing the residue of the formula

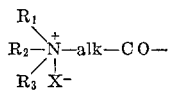

are used as coupling components, the diazo components used may be any diazotizable aromatic or heterocyclic amines. Aromatic amines that may be mentioned are, for example, aminonaphthalenes, but especially aminobenzenes. These preferably correspond to the formula

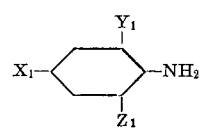

in which $X_1$ represents a hydrogen or halogen atom, a cyano, carbalkoxy or alkylsulphonyl group, a sulphonamide or phenylazo group which may be substituted or a nitro group, $Y_1$ represents a hydrogen or halogen atom or a nitro group, an alkyl group, an alkoxy group, a trifluoromethyl group, a carbalkoxy group or a cyano group and $Z_1$ represents a hydrogen or halogen atom, and in which at least one of the residues $X_1$ and $Y_1$ represents a nitro group, a carbalkoxy group, a cyano group, an alkylsulphonyl group or a phenylazo group.

The following aminobenzenes may be mentioned as examples:

1-amino-4-chlorobenzene,
1-amino-4-bromobenzene,
1-amino-4-methylbenzene,
2-amino-5-nitro-1-phenylmethylsulphone,
1-amino-4-nitrobenzene,
1-amino-4-cyanobenzene,
4-amino-3-chloro-1-phenylmethylsulphone,
1-amino-2,5-dicyanobenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4chlorobenzene,
1amino-2-cyano-4-nitrobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,4-dicyano-6-chlorobenzene,
1-amino-2,4-dinitro-6-chlorobenzene,
4-amino-3-chlorobenzenesulphonic acid dimethylamide,
4-amino-3,5-dichlorobenzenesulphonic acid dimethylamide,
4-amino-2,5-dichlorobenzenesulphonic acid dimethylamide,
4-aminobenzene,
4-amino-2'-chloroazobenzene,
4-amino-2',4-dichloroazobenzene,
4-amino-3'-chloroazobenzene,
4-amino-2'-nitrazobenzene,
4-amino-3-nitrazobenzene,
3-amino-3'-nitrazobenzene,
4-amino-2-methylazobenzene,
4-amino-4'-methoxyazobenzene,
4-amino-3-nitro-2'-chlorazobenzene,
4-amino-3-nitro-4'-chlorazobenzene,
4-amino-3-nitro-2',4'-dichlorazobenzene and
4-amino-3-nitro-4'-methoxyazobenzene.

Suitable heterocyclic diazo components are, for example, 2-aminothiazole, preferably 2-amino-5-nitrothiazole, or especially 2-amino-benzthiazoles, for example, 2-aminothiazole, 2-amino-5-nitrothiazole, 2-amino-5-cyanothiazole, 2-amino-4-methyl-5-nitrothiazole, 2-amino-4-methylthiazole, 2 - amino - 4 - phenylthiazole, 2 - amino-4-(4'-chloro) - phenylthiazole, 2 - amino-4-(4'-nitro)-phenylthiazole, 2 - aminobenzthiazole, 2 - amino-6-methylbenzthiazole, 2 - amino - 6 - -methoxybenzthiazole, 2-amino-6-chlorobenzthiazole, 2 - amino - 6-nitrobenzthiazole, and also 2 - amino-1,3,4-thiadiazole, 2-amino-1,3,5-thiadiazole and 2-amino-4-phenyl-1,3,5-thiadiazole.

Diazotization of the above-mentioned diazo components may be effected by known methods, for example, with the aid of a mineral acid, especially hydrochloric acid, and sodium nitrite.

Coupling may likewise be carried out in known manner, for example, in an acid to alkaline medium, if necessary, in the presence of sodium acetate or some similar buffer or catalyst which influences the rate of coupling, for example, pyridine, or the salts thereof.

In method (b) of the present process a dyestuff containing a halogenated acyl group is reacted with a tertiary amine, for example, trimethylamine, triethylamine, triethanolamine, dimethylcyclohexylamine, N-methylpiperdine or pyridine, advantageously by heating in an excess of the amine in the presence or absence of a solvent. The dyestuff containing a halogenated acyl group is advantageously obtained by coupling a diazotized amine with a coupling component, whereby at least one of the components is an aminonaphthalene containing a halogenated acyl group attached to the naphthalene nucleus.

The starting materials used in method (c) of the present process is a dyestuff in which preferably $R_1$ and $R_2$ are alkyl radicals. This is treated with an alkylating agent, advantageously with an alkyl or aralkyl halide or an alkyl or aralkyl ester of sulphuric acid or an organic sulphonic acid. Examples of alkylating agents are methyl chloride, methyl bromide, methyl iodide, benzyl chloride, trimethyloxonium boron fluoride, dimethyl sulphate, diethyl sulphate, benzene-sulphonic acid methyl ester and para-toluene-sulphonic acid ethyl or butyl ester. Alkylation is advantageously carried out by heating in an inert organic solvent, for example, a hydrocarbon, for example, carbon tetrachloride, tetrachloroethane, chlorobenzene, ortho-dichlorobenzene, or nitro-hydrocarbons, for example, nitromethane, nitrobenzene or nitronaphthalene. It is also possible to use acid anhydrides, acid amides or nitriles, for example, acetic anhydride, dimethylformamide or acetonitrile, or also dimethylsulphoxide. Use can also be made of an excess of alkylating agent instead of an inert solvent. In this case, care must be taken to ensure that the mixture does not heat up excessively, because the reaction is highly exothermic. In most cases, however, especially in the presence of an organic solvent, it is necessary to apply external heat to the reaction mixture in order to initiate the reaction. In special cases, alkylation may also be performed in an aqueous medium or with the use of an alcohol, possibly in the presence of a small amount of potassium iodide.

Purification of the dyestuff salts is advantageously effected by dissolving them in water; any unreacted dyestuff used as starting material can then be removed as insoluble matter by filtration. The dyestuff can be precipitated from the aqueous solution by the addition of a water-soluble salt, for example, sodium chloride.

The dyestuffs obtainable by the process of the invention preferably contain as anion the residue of a strong acid, for example, sulphuric acid, or the semi-esters thereof, or the residue of an arylsulphonic acid, or a halogen ion. The above-mentioned anions introduced into the dyestuff molecule in accordance with the invention may also be replaced by anions of other inorganic acids, for example, by anions of phosphoric acid or sulphuric acid, or by anions of organic acids, for example, those of formic acid, acetic acid, chloracetic acid, oxalic acid, lactic acid or tartaric acid; it is also possible to use the free bases in certain cases. The dyestuff salts may also be in the form of double salts, for example, with halides of elements of Group II of the Periodic Table, especially zinc or cadmium chloride.

The dyestuff salts obtained by the process of the invention are suitable for dyeing and printing a very wide variety of materials, for example, tannin-treated cellulosic fibres, silk, hair, leather, and also fully synthetic fibres, especially polyacrylonitrile and polyvinylidene cyanide (Darvan). Dyeings produced oin these fibres are distinguished by a very good fastness to light. The dyestuffs are also capable of ensuring good reservation of wool, which makes them specially suitable for the dyeing of union fabrics made from wool and polyacrylonitrile fibre. Also worthy of mention is the fact that the dyeings obtained display a good fastness to carbonizing.

The present invention also includes the starting materials containing a ternary nitrogen atom corresponding to the quaternated dyestuffs prepared in accordance with method (c) and which are primarily suitable for use as disperse dyestuffs in the dyeing of cellulose acetate fibres, and especially fully synthetic polyester fibers, for example, polyethylene terephthalate fibers.

The following examples illustrate the invention. Unless otherwise stated, the parts and percentages are by weight.

EXAMPLE 1

25 parts by volume of a solution of 2.79 parts of a mixture of 1-amino-4-, -5- and -8-[α-(N-chlorotrimethylamino)-acetyl]-naphthalene in hydrochloric acid are diazotized with 10 parts by volume of an N-sodium nitrite solution. The solution so obtained is run into a mixture of 1.6 parts of N-methyl-N-2-cyanoethylaniline, 50 parts by volume of ethyl alcohol and 50 parts of ice, and the reaction mixture is rendered neutral to Congo paper by the addition of sodium acetate. After coupling, the dyestuff is precipitated by the addition of sodium chloride, isolated by filtration and dried. It dyes polyacrylonitrile fibres fast, red-orange tints.

The mixture of 1-amino-4-, -5- and -8-[α-(N-chlorotrimethylamino)-acetyl]-naphthalene is prepared as follows:

18.5 parts of 1-acetylaminonaphthalene are stirred into 125 parts by volume of carbon disulphide and then 47 parts of aluminum chloride powder are added quickly. 20 parts of chloracetyl chloride are added to the mixture at 20 to 25° C. in the course of one hour dropwise and the batch is subsequently heated for 2 to 3 hours at 40 to 45° C. until the evolution of hydrochloric acid is finished. The carbon disulphide is poured off, the viscous brown mass which remains is decomposed with ice, and the chloracetyl compound which is obtained in a good yield is isolated by filtration.

26.2 parts of the chloroacetyl compound are introduced into a mixture of 50 parts by volume of acetone and 50 parts by volume of water and then 25 parts by volume of a 4 N aqueous trimethylamine solution are added. The batch is stirred for 6 hours at 20 to 25° C. and then for 2 hours at 30° C., diluted with 100 parts by volume of water, the acetone is allowed to evaporate, 50 parts by volume of concentrated hydrochloric acid are added and the solution is boiled for 1 hour under reflux. The solution so obtained can be used as it is in the manufacture of the dyestuffs.

A mixture of 2-amino-6- and -8-[α-(N-chlorotrimethylamino)-acetyl]-naphthalene can be obtained in an analogous manner from 2-acetylamino-naphthalene.

Similar new diazotization or coupling components are obtainable when the trimethylamine is replaced by an equivalent amount of triethylamine, dimethylamine, N-methylpiperidine or pyridine.

By using in Example 1 the coupling components indicated in Column II of Table 1 below instead of N-methyl-N-2-cyanoethylaniline, basic dyestuffs are obtained which dye polyacrylonitrile the tints listed in Column III.

TABLE 1

| I | II<br>Coupling component | III<br>Tint |
|---|---|---|
| 1 | 2-methylindole | Orange. |
| 2 | 3-methylpyrazolone-(5) | Yellow. |
| 3 | 2-naphthylamine | Red. |
| 4 | Diphenylamine | Orange. |
| 5 | Barbituric acid | Yellow. |
| 6 | 1,3,3-trimethyl-2-methylene-indolenine | Orange. |
| 7 | Indane-1,3-dione | Do. |

EXAMPLE 2

13.8 parts of 4-nitraniline are dissolved in a mixture of 30 parts of water and 30 parts by volume of concentrated hydrochloric acid; 80 parts of ice are added and diazotization is effected by the addition of 6.9 parts of pure pulverized sodium nitrite. The diazo solution so obtained is run into a solution of 27.9 parts of a mixture of 1-amino-4-, -5- and -8-[α-(N-chlorotrimethylamino)-acetyl]-naphthalene in water while cooling with ice, and the coupling mixture is rendered neutral to Congo paper by the gradual addition of sodium acetate. The dyestuff which precipitates subsequent to coupling is isolated by filtration and dried. It dyes polyacrylonitrile fibres fast, red-brown tints when applied in the form of an aqueous solution.

Brown dyeings are likewise obtained by using 2,4-dinitraniline or 2,6-dichloro-4-nitraniline instead of 4-nitraniline.

EXAMPLE 3

2.79 parts of a mixture of 2-amino-6- and -8-[α-(N-chlorotrimethylamino)-acetyl]-naphthalene are diazotized in the manner described in Example 1. The diazo solution so obtained is run into an ice-cold neutral solution of 2.23 parts of 2-naphthylamine-1-sulphonic acid while stirring, and the coupling mixture is kept neutral to Congo paper by the addition of sodium acetate crystals. The dyestuff which precipitates subsequent to coupling in the form of dark red grains dyes polyacrylonitrile fibres clear, orange tints.

By using the coupling components listed in Column II of Table 2 below instead of 2-naphthylamine-1-sulphonic acid, dyestuffs are obtained which yield the tints listed in Column III.

TABLE 2

| I | II<br>Coupling component | III<br>Tint |
|---|---|---|
| 1 | 2-methylindole | Yellow. |
| 2 | 1-phenyl-3-methylpyrazolone-(5) | Do. |
| 3 | N-methyl-N-2-cyanoethylaniline | Do. |
| 4 | Di-(2-cyanoethyl)-aniline | Orange. |
| 5 | N-ethyl-2-naphthylamine | Red. |
| 6 | Diphenylamine | Orange. |
| 7 | Indane-1,3-dione | Yellow. |
| 8 | 3-methyl-N,N-bis-(2'-cyanoethyl)-aniline | Orange. |
| 9 | N,2-cyanoethyl-N,2'-hydroxy-ethylaniline | Do. |
| 10 | 3-methylpyrazolone-(5) | Yellow. |
| 11 | 5-amino-1-phenylpyrazole | Do. |

EXAMPLE 4

The procedure described in Example 2 is followed, but the coupling component used is a mixture of 2-amino-6- and -8-[α-(N-chlorotrimethylamino)-acetyl]-naphthalene. After coupling, the dyestuff is salted out with sodium chloride, isolated by filtration and dried. It dyes polyacrylonitrile fibres fast-to-light scarlet tints when applied in an aqueous bath.

Further dyestuffs which produce the tints listed in Column III of Table 3 below are obtained when the 4-nitraniline is replaced as diazo component by the compounds listed in Column II.

TABLE 3

| I | II<br>Diazo component | III<br>Tint |
|---|---|---|
| 1 | 2-chloro-4-nitraniline | Red. |
| 2 | 2-methoxy-4-nitraniline | Do. |
| 3 | 2-methoxy-5-nitraniline | Orange. |
| 4 | 2,4-dinitraniline | Violet. |
| 5 | 2-cyano-4-nitraniline | Claret. |
| 6 | 2-amino-6-ethoxybenzthiazole | Do. |
| 7 | 3-trifluoromethylaniline | Yellow. |
| 8 | 1-amino-2,4-dinitro-6-chlorobenzene | Violet. |
| 9 | 4-aminobenzoic acid-2'-methoxyethylester | Orange. |
| 10 | 4-amino-3-chloro-1-phenylmethylsulphone | Do. |
| 11 | 1-aminonaphthalene | Yellow-brown. |
| 12 | 2,6-dichloro-4-nitraniline | Red. |
| 13 | 4-aminoazobenzene | Red. |
| 14 | 2-amino-5-nitrodiphenylether | Red. |
| 15 | 2-amino-5-nitro-4'-chlorodiphenylether | Red. |
| 16 | 2-amino-5-nitro-1-phenylmethylsulphone | Violet. |
| 17 | 2-amino-5-nitrothiazole | Blue. |

EXAMPLE 5

1.82 parts of 2-chloro-nitraniline are diazotized in the usual manner and coupled with a hydrochloric acid solution containing 2.87 parts of a mixture of 2-amino-6- and -8-]α-(N-chloropyridino)-acetyl]- naphthalene. The mixture is rendered neutral to Congo paper by the addition of sodium acetate and the dyestuff is precipitated by the addition of sodium chloride. The dyestuff yields red dyeings possessing good properties of fastness on polyacrylonitrile fibres.

EXAMPLE 6

4.14 parts of 2,6-dichloro-4-nitraniline are diazotized in nitrosyl hydrogen sulphate and the diazo compound so obtained is added dropwise to a hydrochloric acid solution of 4.4 parts of a mixture of 2-amino-6- and -8-chloroacetylnaphthalene which is cooled with ice. The batch is rendered neutral to Congo paper by the slow addition of aqueous sodium acetate solution, the water-soluble dyestuff is isolated by filtration, washed well with water and dried.

4.37 parts of the dyestuff so obtained which contains a chloroacetyl group are stirred with 10 parts of pyridine for 1 hour at 120° C. until a test sample is completely soluble in water. The batch is diluted with 100 parts of water and the dyestuff is precipitated by the addition of 10 parts of sodium chloride. It dyes polyacrylonitrile fibers fast, red-brown tints.

Dyestuffs having similar dyeing properties are obtainable when the pyridine is replaced by the same amounts of N-methylpiperidine or N-methylmorpholine.

Basic dyestuffs yielding the tints indicated in Column IV in Table 4 below are obtained in an analogous manner by coupling the diazo compound of an amine listed in Column II with the mixture of 2-amino-6- and -8-chloroacetylnaphthalene and then effecting reaction with a tertiary base listed in Column III.

TABLE 4

| I | II | III | IV. |
|---|---|---|---|
| 1 | 2-chloro-4-nitraniline | Pyridine | Red. |
| 2 | 4-amino-3-chloro-1-phenyl-methylsulphone | do | Orange. |
| 3 | 4-nitraniline | N-methylpyrrolidine | Scarlet. |
| 4 | do | N-methylmorpholine | Do. |
| 5 | 4-aminoazobenzene | Pyridine | Red. |
| 6 | 2-amino-5-nitrothiazole | N-methylpiperidine | Blue. |
| 7 | 2-amino-6-ethoxybenzthiazole | do | Red. |

EXAMPLE 7

Using 2-acetylaminonaphthalene as starting material, the same procedure is followed as in Example 1 for the manufacture of the intermediate product, but replacing the trimethylamine with an equivalent amount of dimethylamine solution. Subsequent to acidic hydrolysis, a solution is obtained containing the mixture of 2-amino-6- and -8-(α-dimethylamino)-acetylnaphthalene. 70 parts by volume of a hydrochloric acid aqueous solution containing 6.84 parts of the above mixture are diazotized by the addition of 7.5 parts of a 4 N sodium nitrile solution while cooling with ice, and the diazo solution is combined at 0° C. with a solution of 5.97 parts of N,N-bis-2-cyanoethylaniline in 100 parts of dimethylformamide. The mixture is rendered neutral to Congo paper by the addition of sodium acetate, stirred for several hours and then diluted with 500 parts of water. The dyestuff which precipitates is isolated by filtration, washed with water and dried. 8.76 parts of the brown dyestuff powder so obtained, 200 parts of chlorobenzene and 10 parts of dimethyl sulphate are stirred for 6 hours at 110° C., 200 parts of water are added, and the chlorobenzene is removed with steam. The dyestuff is precipitated out of the aqueous solution by the addition of sodium chloride. It dyes polyacrylonitrile fibres strong, orange tints possessing a good fastness to light.

Fast, reddish yellow dyeings are obtained by using 1,2-dimethylindole instead of N,N-bis-2-cyanoethylaniline.

EXAMPLE 8

7,54 parts of the dyestuff obtained by coupling diazotized 4-nitraniline with a mixture of 2-amino-6- and -8-(α-dimethylamino)-acetylnaphthalene are dissolved in 200 parts of chlorobenzene and the solution is then heated for 10 hours at 130° C. together with 2.6 parts of benzyl chloride. The chlorobenzene is then removed by steam distillation, the aqueous mixture which remains is filtered while hot to remove any unreacted dyestuff, and then the dyestuff is precipitated from the clear solution by the addition of a small amount of sodium chloride. It dyes polyacrylonitrile fibres scarlet tints possessing excellent properties of fastness.

A dyestuff which is identical with the one described in Example 4 is obtained when quaternation is effected with dimethyl sulphate instead of benzyl chloride.

Dyeing prescription 1 part of the dyestuff obtained in the manner described in the first paragraph of Example 1 is dissolved in 5,000 parts of water in the presence of 2 parts of acetic acid of 40% strength. 100 parts of dried polyacrylonitrile staple fibre yarn are entered into the dyebath so prepared at 60° C., the temperature is raised to 100° C. in the course of 30 minutes, and dyeing is carried out for one hour at the boil. The yarn is then well rinsed and dried. A red-orange dyeing possessing a very good fastness to light, to sublimation and to washing is obtained.

What is claimed is:
1. An azo-dyestuff of the formula

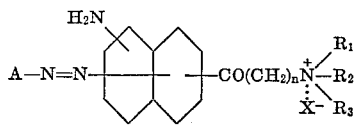

in which $R_1$ and $R_2$ each represents a member selected from the group consisting of lower alkyl, hydroxy-lower alkyl, phenyl-lower alkyl and cyclo-lower alkyl, $R_3$ represents lower alkyl or hydroxy-lower alkyl; $R_1$ and $R_2$ taken together with the nitrogen atom represent a member selected from the group consisting of an unsubstituted or lower alkyl-substituted piperidine, morpholine or pyrrolidine ring and $R_1$, $R_2$ and $R_3$ taken together with the nitrogen atom represent an unsubstituted or lower-alkyl-substituted pyridinium ring, X represents an anion of a strong inorganic acid, of a sulfuric acid semi-ester, of a carboxylic acid or of a sulfonic acid, $n$ is 1 or 2 and A represents a benzene of the formula

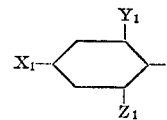

in which $X_1$ is a member selected from the group consisting of hydrogen, chlorine, bromine, cyano, lower carbalkoxy, lower alkyl-sulfonyl, sulfonamide, N-lower alkyl sulfonamide, nitro, phenylazo, nitrophenylazo, chlorophenylazo, lower alkylphenylazo and lower alkoxyphenylazo, $Y_1$ is a member selected from the group consisting of hydrogen, chlorine, bromine, nitro, lower alkyl, lower alkoxy, trifluoromethyl, lower carbalkoxy and cyano and $Z_1$ is a member selected from the group consisting of nitro, lower carbalkoxy, cyano, lower alkylsulfonyl, hydrogen, chlorine and bromine.

2. An azo-dyestuff as claimed in claim 1 of the formula

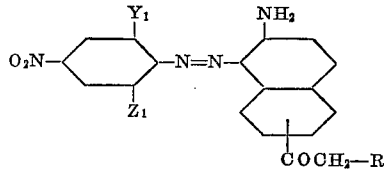

in which $Y_1$ represents a member selected from the group consisting of hydrogen, chloro, bromo, nitro, methylsulfone and cyano, $Z_1$ is a member selected from the group consisting of hydrogen, chloro and bromo and R is a member selected from the group consisting of

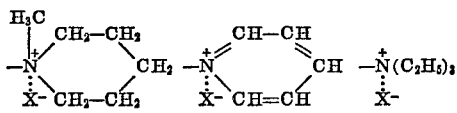

and

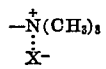

wherein $X^-$ is selected from the group consisting of an anion, of a strong inorganic acid, a sulfuric acid semiester, a carboxylic acid and a sulfonic acid.

3. The azo-dyestuff as claimed in claim 1 of the formula

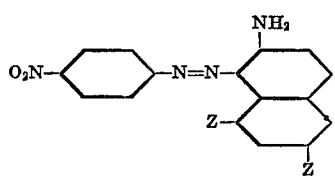

wherein one Z is hydrogen and the other Z is

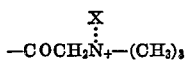

4. The azo-dyestuff as claimed in claim 1 of the formula

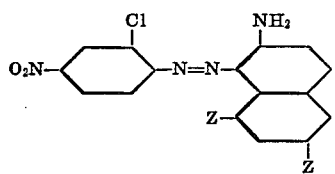

wherein one Z is hydrogen and the other Z is

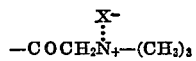

5. The azo-dyestuff as claimed in claim 1 of the formula

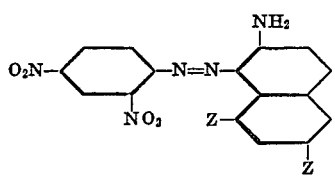

wherein one Z is hydrogen and the other Z is

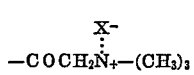

6. The azo-dyestuff as claimed in claim 1 of the formula

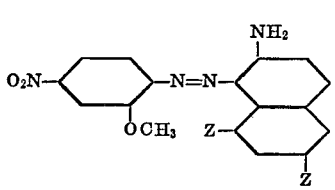

wherein one Z is hydrogen and the other Z is

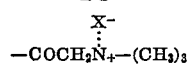

7. The azo-dyestuff as claimed in claim 1 of the formula

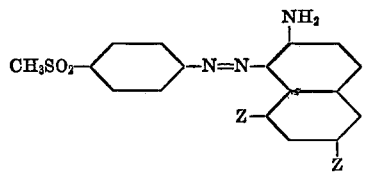

wherein one Z is hydrogen and the other Z is

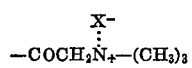

8. The azo-dyestuff as claimed in claim 1 of the formula

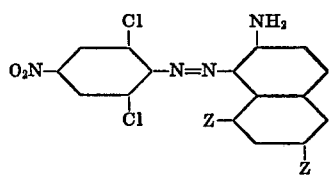

wherein one Z is hydrogen and the other Z is

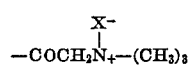

9. The azo-dyestuff as claimed in claim 1 of the formula

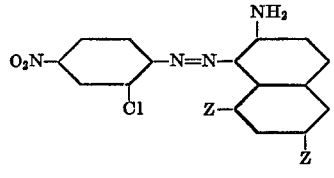

wherein one Z is hydrogen and the other Z is

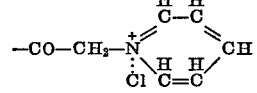

10. The azo-dyestuff as claimed in claim 1 of the formula

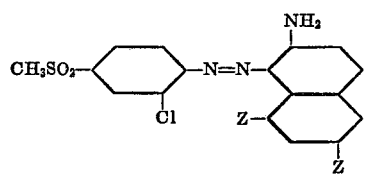

wherein one Z is hydrogen and the other Z is

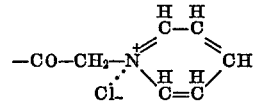

11. The azo-dyestuff as claimed in claim 1 of the formula

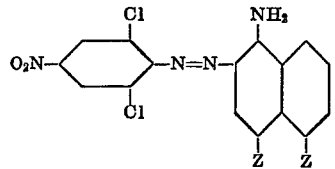

wherein one Z is hydrogen and the other Z is
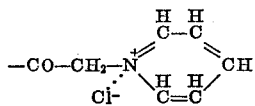
12. The azo-dyestuff as claimed in claim 1 of the formula
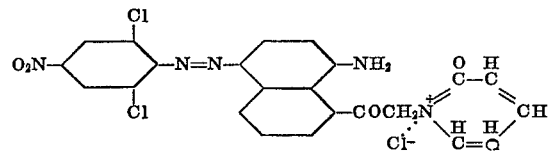
References Cited
UNITED STATES PATENTS
| | | | |
|---|---|---|---|
| 2,128,256 | 8/1938 | Krzikalla et al. | 260—200 |
| 2,821,526 | 1/1958 | Boyd | 260—205 |
| 3,074,926 | 1/1963 | Sartori | 260—191 |
| 3,117,960 | 1/1964 | Illy | 260—156 |
| 3,403,143 | 9/1968 | Ramanathan | 260—158 |
CHARLES B. PARKER, Primary Examiner
D. M. PAPUGA, Assistant Examiner
U.S. Cl. X.R.
8—10, 13, 177, 179; 260—146 D, 152, 154, 155, 158, 162, 165, 184, 191, 194, 196, 294.7 J, 429 R, 429.9, 459, 501.15, 567.6 M

UNITED STATES PATENT OFFICE
CERTIFICATE OF CORRECTION

Patent No. 3,631,164          Dated December 28, 1971

Inventor(s) GERT HEGAR

It is certified that error appears in the above-identified patent and that said Letters Patent are hereby corrected as shown below:

Column 9, line 32, "X" should read --- $X^-$ ---.

Column 10, line 64, "Cl" should read --- $Cl^-$ ---.

Column 11, lines 13-15, the right-hand side of the formula should read:

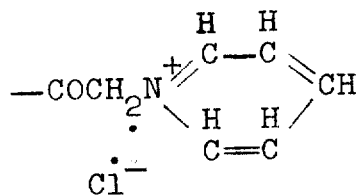

Signed and sealed this 8th day of August 1972.

(SEAL)
Attest:

EDWARD M. FLETCHER, JR.          ROBERT GOTTSCHALK
Attesting Officer                 Commissioner of Patents